United States Patent
Singh et al.

(10) Patent No.: US 10,419,356 B1
(45) Date of Patent: Sep. 17, 2019

(54) APPARATUS, SYSTEM, AND METHOD FOR DISCOVERING NETWORK PATH MAXIMUM TRANSMISSION UNITS

(71) Applicant: Juniper Networks, Inc., Sunnyvale, CA (US)

(72) Inventors: Prashant Singh, Santa Clara, CA (US); Sairam Neelam, Hyderabad (IN)

(73) Assignee: Juniper Networks, Inc, Sunnyvale, CA (US)

( * ) Notice: Subject to any disclaimer, the term of this patent is extended or adjusted under 35 U.S.C. 154(b) by 124 days.

(21) Appl. No.: 15/657,113

(22) Filed: Jul. 22, 2017

(51) Int. Cl.
*H04L 12/805* (2013.01)
*H04L 12/26* (2006.01)
*H04L 12/825* (2013.01)
*H04L 12/24* (2006.01)

(52) U.S. Cl.
CPC ........... *H04L 47/365* (2013.01); *H04L 43/10* (2013.01); *H04L 47/26* (2013.01); *H04L 41/0681* (2013.01)

(58) Field of Classification Search
None
See application file for complete search history.

(56) References Cited

U.S. PATENT DOCUMENTS

| | | | | |
|---|---|---|---|---|
| 2003/0193942 | A1* | 10/2003 | Gil | H04L 49/90 370/389 |
| 2007/0171828 | A1* | 7/2007 | Dalal | H04L 47/10 370/235 |
| 2009/0067325 | A1* | 3/2009 | Baratakke | H04L 69/16 370/229 |
| 2009/0201828 | A1* | 8/2009 | Samuels | H04L 69/16 370/252 |
| 2010/0322249 | A1* | 12/2010 | Thathapudi | H04L 47/10 370/395.1 |
| 2011/0103399 | A1* | 5/2011 | Bransi | H04L 12/4633 370/470 |

(Continued)

OTHER PUBLICATIONS

Sreekanth Rupavatharam et al; Method, System, and Apparatus for Achieving User Space Intervention During Connection-Establishment Handshakes; U.S. Appl. No. 15/241,834, filed Aug. 18, 2016.

(Continued)

*Primary Examiner* — Ayaz R Sheikh
*Assistant Examiner* — Faiyazkhan Ghafoerkhan
(74) *Attorney, Agent, or Firm* — FisherBroyles, LLP

(57) ABSTRACT

The disclosed apparatus may include (1) forwarding, along a network path, a test packet that is (A) destined for an invalid port on a destination device and (B) fragmented by an intermediary device within the network path according to an MTU value of a network interface on the intermediary device, (2) receiving an error packet sent by the destination device in response to having determined that the test packet is destined for the invalid port, (3) determining a PMTU value of the network path by identifying, within the error packet, a size of the largest fragmented segment of the test packet received by the destination device, and then (4) forwarding, along the network path, at least one packet sized to comply with the PMTU value such that the packet remains unfragmented upon reaching the destination device. Various other apparatuses, systems, and methods are also disclosed.

20 Claims, 7 Drawing Sheets

(56) References Cited

U.S. PATENT DOCUMENTS

| | | | | |
|---|---|---|---|---|
| 2011/0243138 | A1* | 10/2011 | Oh | H04L 69/16 |
| | | | | 370/392 |
| 2011/0305143 | A1* | 12/2011 | Gray | H04L 45/02 |
| | | | | 370/242 |
| 2012/0051236 | A1* | 3/2012 | Hegde | H04L 43/10 |
| | | | | 370/252 |
| 2013/0003553 | A1* | 1/2013 | Samuels | H04L 41/00 |
| | | | | 370/235 |
| 2014/0101435 | A1* | 4/2014 | Kinoshita | H04L 63/164 |
| | | | | 713/151 |
| 2014/0233565 | A1* | 8/2014 | Mahapatra | H04L 45/74 |
| | | | | 370/392 |
| 2014/0301395 | A1* | 10/2014 | Khanal | H04L 45/021 |
| | | | | 370/392 |
| 2015/0071067 | A1* | 3/2015 | Martin | G06F 11/2002 |
| | | | | 370/235 |
| 2016/0234101 | A1* | 8/2016 | Sundar | H04L 47/365 |
| 2016/0248749 | A1* | 8/2016 | Mahapatra | H04L 45/74 |
| 2016/0380894 | A1* | 12/2016 | Kandasamy | H04L 45/74 |
| | | | | 370/392 |
| 2017/0019344 | A1* | 1/2017 | Przygienda | H04L 45/586 |
| 2018/0048567 | A1* | 2/2018 | Ignatchenko | H04L 45/3065 |

OTHER PUBLICATIONS

Prashant Singh et al.; Apparatus, System, and Method for Fragmenting Packets Into Segments That Comply With the Maximum Transmission Unit of Egress Interfaces; U.S. Appl. No. 15/615,016, filed Jun. 6, 2017.

Rajeshwar Sheshrao Sable et al.; Apparatus, System, and Method for Indicating Statuses of Multilink Network Ports; U.S. Appl. No. 15/640,496, filed Jul. 1, 2017.

Kassaras; IPV4, IPV6, TCP, UDP ICMP for Pentesting; http://securityhorror.blogspot.com/p/ipv.4.html; Aug. 3, 2014.

Huston; Evaluating IPv4 and IPv6 Packet Fragmentation; https://labs.ripe.net/Members/gih/evaluating-ipv4-and-ipv6-packet-fragmentation; Jan. 29, 2016.

Wikipedia; Internet Control Message Protocol; https://en.wikipedia.org/wiki/Internet_Control_Message_Protocol; Apr. 23, 2017.

Wikipedia; User Datagram Protocol; https://en.wikipedia.org/wiki/User_Datagram_Protocol; Jun. 5, 2017.

* cited by examiner

APPARATUS, SYSTEM, AND METHOD FOR DISCOVERING NETWORK PATH MAXIMUM TRANSMISSION UNITS

BACKGROUND

Network devices may include various interfaces that have different Maximum Transmission Units (MTUs). In this context, the MTU may represent and/or refer to the size of the largest packet capable of being transmitted via a certain interface. In some network paths, interfaces of one or more devices along the path may have different MTUs. For example, a source device at the beginning of a network path may have an MTU of 2000 bytes, while an intermediary device in the middle of the network path may have an MTU of 1400 bytes. Accordingly, the intermediary device may need to fragment packets of over 1400 bytes into segments of 1400 bytes or less before being able to forward the packets to the next downstream device in the path. When each fragmented segment of the packets reaches the destination device of the network path, the destination device may reassemble the segments to produce the original packets.

Unfortunately, the process of fragmenting and reassembling packets may be costly and/or time-intensive. For example, transmitting multiple packet segments may be less efficient than transmitting a single, larger packet. Moreover, some packets may be formatted or configured to prohibit and/or prevent fragmentation. For example, some packets may contain a flag or other notification that indicates, to devices within a network path, that the packets are to be dropped instead of fragmented upon reaching a device with an MTU smaller than the size of the packets. As a result, these packets may be unable to reach their intended destinations.

To avoid both fragmented and dropped packets, network devices and/or network administrators may implement a variety of techniques to determine a Path MTU (PMTU) of a network path. Packets sized to comply with or correspond to this value may be transmitted along the path without being dropped or fragmented. In one example, a traditional method for determining the PMTU of a network path may involve sending progressively smaller test packets along the path until a test packet successfully reaches the destination device of the path without being fragmented. While this process may be improved or optimized in various ways (e.g., by using a binary search or other algorithm to select test packet sizes), traditional methods for discovering PMTUs may generally require forwarding multiple test packets along a network path. Accordingly, these conventional methods may often delay or slow transmission of traffic along the path.

The instant disclosure, therefore, identifies and addresses a need for additional and improved apparatuses, systems, and methods for discovering PMTUs.

SUMMARY

As will be described in greater detail below, the instant disclosure generally relates to apparatuses, systems, and methods for discovering PMTUs. In one example, a computer-implemented method for discovering PMTUs may include (1) forwarding, along a network path, a test packet that is (A) destined for an invalid port on a destination device and (B) fragmented by an intermediary device within the network path according to an MTU value of a network interface on the intermediary device, (2) receiving an error packet sent by the destination device in response to having determined that the test packet is destined for the invalid port, (3) determining a PMTU value of the network path by identifying, within the error packet, a size of the largest fragmented segment of the test packet received by the destination device, and then (4) forwarding, along the network path, at least one packet sized to comply with the PMTU value such that the packet remains unfragmented upon reaching the destination device.

As another example, a system for implementing the above-described method may include various modules stored in memory. The system may also include at least one physical processor that executes these modules. For example, the system may include (1) a forward module that forwards, along a network path, a test packet that is (A) destined for an invalid port on a destination device and (B) fragmented by an intermediary device within the network path according to an MTU value of a network interface on the intermediary device, (2) a receiving module that receives an error packet sent by the destination device in response to having determined that the test packet is destined for the invalid port, and (3) a determining module that determines a PMTU value of the network path by identifying, within the error packet, a size of the largest fragmented segment of the test packet received by the destination device. In some examples, the forwarding module may also forward, along the network path, at least one packet sized to comply with the PMTU value such that the packet remains unfragmented upon reaching the destination device.

As a further example, an apparatus for implementing the above-described method may include (1) at least one storage device that stores information that identifies an invalid port on a destination device and (2) at least one physical processing device that is communicatively coupled to the storage device, wherein the physical processing device (A) forwards, along a network path, a test packet that is (I) destined for the invalid port on the destination device and (II) fragmented by an intermediary device within the network path according to an MTU value of a network interface on the intermediary device, (B) receives an error packet sent by the destination device in response to having determined that the test packet is destined for the invalid port, (C) determines a PMTU value of the network path by identifying, within the error packet, a size of the largest fragmented segment of the test packet received by the destination device, and (D) forwards, along the network path, at least one packet sized to comply with the PMTU value such that the packet remains unfragmented upon reaching the destination device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
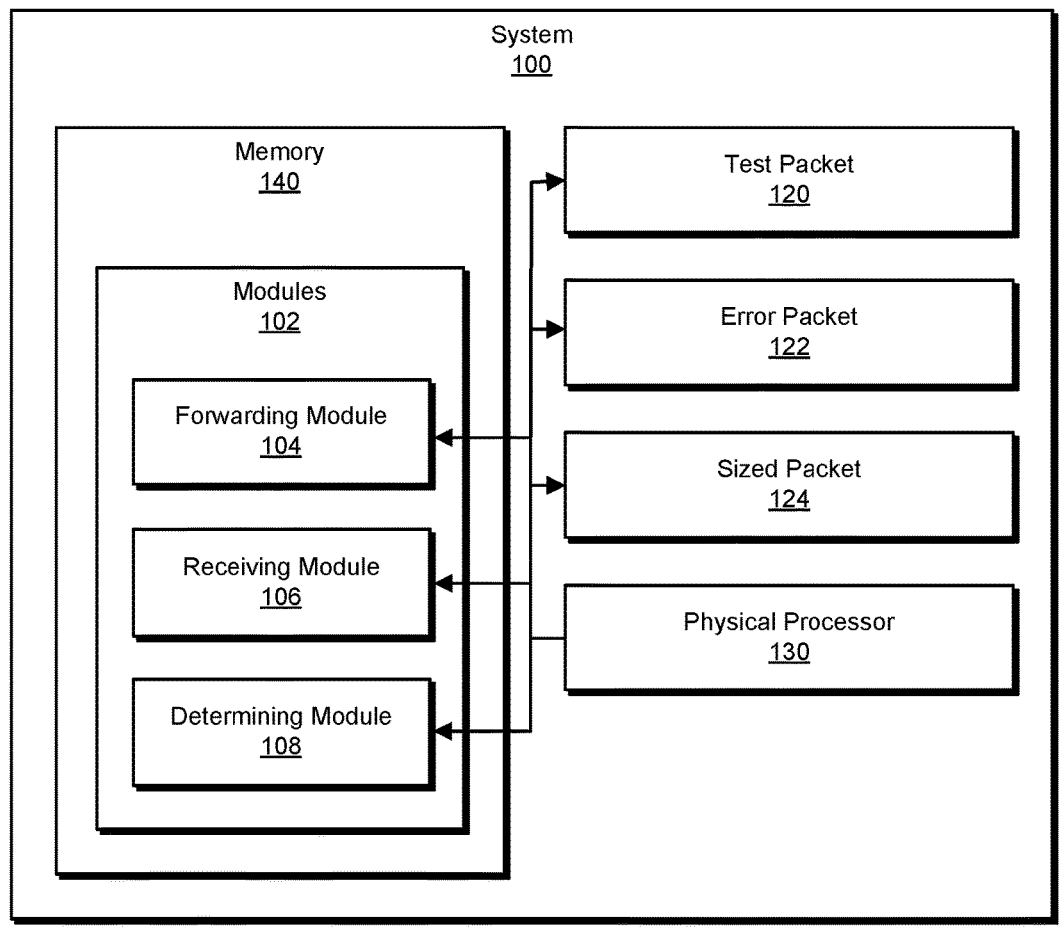
FIG. 1 is a block diagram of an exemplary system for discovering PMTUs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for discovering PMTUs. As will be explained in greater detail below, embodiments of the instant disclosure may facilitate discovering the PMTU of a network path by forwarding a single test packet along the path. In one example, a source device at the ingress of a network path may forward a test packet that is destined for an invalid port on a destination device at the egress of the network path. This invalid port may be known, by both the source device and the destination device, to be a port dedicated for PMTU discovery. While the test packet traverses the network path, one or more intermediary devices within the path may fragment the test packet into segments such that the segments comply with MTU values of the intermediary devices.

Continuing with this example, the destination device may return an error message to the source device in response to receiving the fragmented test packet destined for the invalid port. In addition, the destination device may insert, into the error message, an indication of the size of the largest fragmented segment of the test packet. This size may represent the PMTU of the network path. Accordingly, the source device may efficiently determine the PMTU of the network path (without transmitting multiple test packets, as may be required by traditional PMTU discovery methods).

Figure 2:
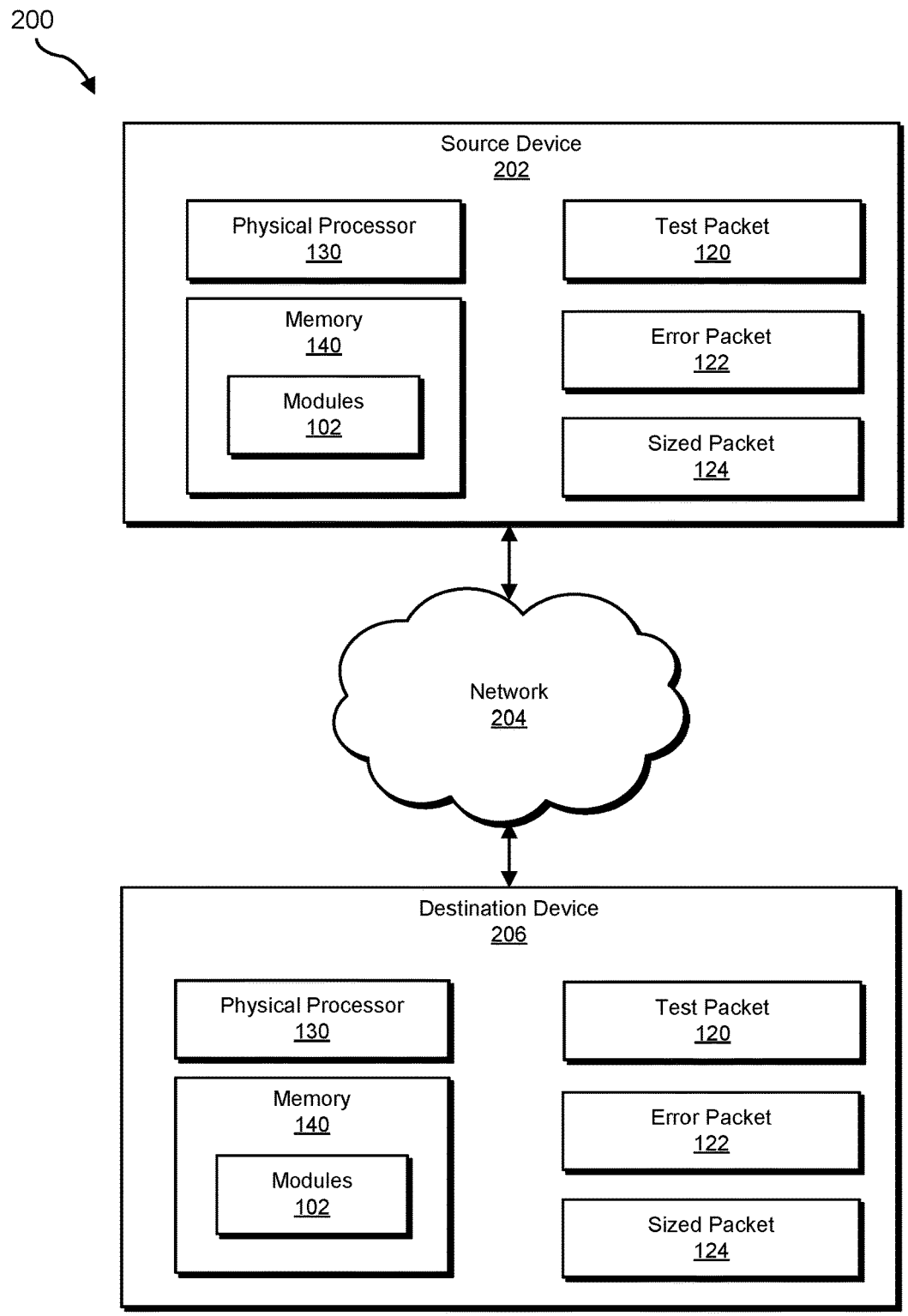
FIG. 2 is a block diagram of an additional exemplary system for discovering PMTUs.

The following will provide, with reference to FIGS. 1 and 2, examples of exemplary systems for discovering PMTUs. The discussion corresponding to FIG. 3 will describe an exemplary method for discovering PMTUs. The discussion corresponding to FIG. 4 will describe exemplary test packets used to discover PMTUs. The discussion corresponding to FIG. 5 will describe an exemplary implementation of a system for discovering PMTUs. The discussion corresponding to FIG. 6 will describe exemplary error packets used to discover PMTUs. Finally, the discussion corresponding to FIG. 7 will provide numerous examples of systems that may include the components shown in FIGS. 1, 2, and 4-6.

FIG. 1 is a block diagram of an exemplary system 100 for discovering PMTUs. As illustrated in this figure, exemplary system 100 may include one or more modules 102 for performing one or more tasks. As will be explained in greater detail below, modules 102 may include a forwarding module 104, a receiving module 106, and a determining module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., source device 202 and/or destination device 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate discovering PMTUs. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more packets, such as a test packet 120, an error packet 122, and a sized packet 124. The term "packet," as used herein, generally refers to any unit of formatted data transferred between two or more computing devices. In some examples, test packet 120 may represent a packet forwarded along a network path in order to discover and/or test the PMTU of the network path. Specifically, test packet 120 may represent a packet sent from a source device of a network path to an invalid port on a destination device of the network path. In some embodiments, error packet 122 may represent a packet sent along the reverse of a network path by a destination device in response to receiving a test packet destined for an invalid port. In one example, error packet 122 may indicate the PMTU of the network path. Furthermore, sized packet 124 may represent any packet that has been sized to comply with the PMTU of a network path.

Exemplary system 100 in FIG. 1 may be implemented in a variety of ways. For example, all or a portion of exemplary system 100 may represent portions of exemplary system 200 in FIG. 2. As shown in FIG. 2, system 200 may include a source device 202 in communication with a destination device 206 via a network 204. In one example, all or a portion of the functionality of modules 102 may be performed by source device 202, destination device 206, and/or any other suitable computing system. Various other computing devices (not necessarily illustrated in FIG. 2) may also represent part of and/or be included in system 200 and/or network 204.

In one example, source device 202 and/or destination device 206 may include instances of physical processor 130 and/or memory 140. In this example, the instances of physical processor 130 may be programmed to execute one or more of modules 102 stored within the instances of memory 140. Additionally or alternatively, source device 202 and/or destination device 206 may generate, forward, and/or receive test packet 120, error packet 122, and/or sized packet 124.

As will be described in greater detail below, one or more of modules 102 from FIG. 1 may, when executed by at least one processor of source device 202 and/or destination device 206, enable source device 202 and/or destination device 206 to discover the PMTU of a network path between source device 202 and destination device 206. In one example, source device 202 may initiate forwarding test packet 120 along a network path to an invalid port on destination device 206. Upon determining that test packet 120 is addressed to the invalid port, destination device 206 may respond by sending error packet 122 to source device 202. In one embodiment, error packet 122 may indicate the PMTU of the network path between source device 202 and destination device 206.

Source device 202 and destination device 206 generally represent any type or form of computing devices capable of reading computer-executable instructions and/or forwarding network traffic within a network and/or across networks. In one example, source device 202 and destination device 206 may represent any set of computing devices between which network packets may be transferred (e.g., via one or more additional devices). In some embodiments, source device 202 and destination device 206 may represent network devices, such as routers, modems, hubs, repeaters, optical transceivers, bridges, switches, and/or gateways. Additional examples of source device 202 and destination device 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. Network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
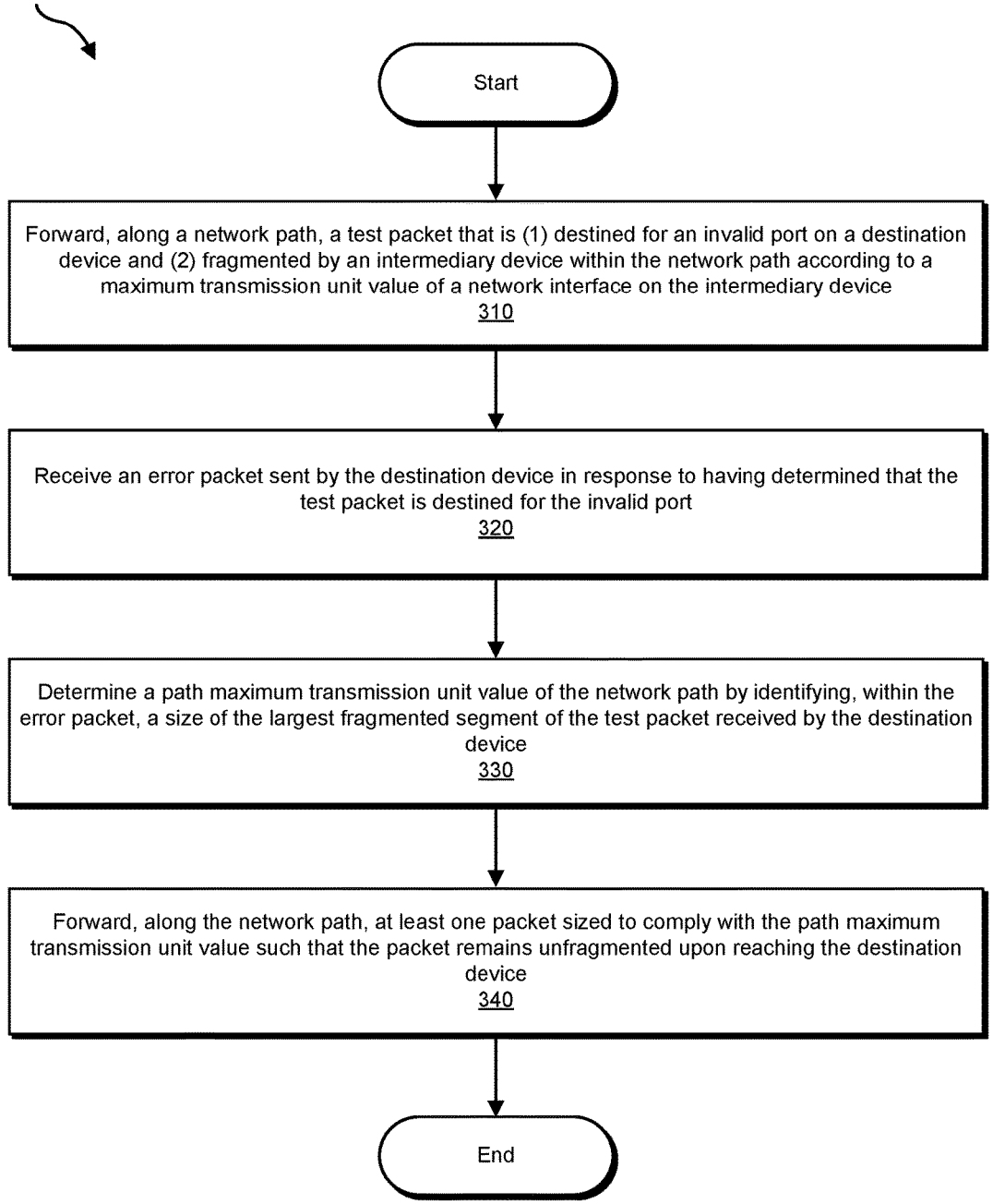
FIG. 3 is a flow diagram of an exemplary method for discovering PMTUs.

FIG. 3 is a flow diagram of an exemplary computer-implemented method 300 for discovering PMTUs. The steps shown in FIG. 3 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may forward, along a network path, a test packet that is (1) destined for an invalid port on a destination device and (2) fragmented by an intermediary device within the network path according to an MTU value of a network interface on the intermediary device. For example, forwarding module 104 may, as part of source device 202 in FIG. 2, forward test packet 120 along a network path. In this example, test packet 120 may be (1) destined for an invalid port on destination device 206 and (2) fragmented by an intermediary device within the network path according to an MTU value of a network interface on the intermediary device. The MTU value of the network interface may represent and/or indicate the largest packet size that the network interface is capable of forwarding. Accordingly, the intermediary device may fragment test packet 120 into multiple segments in the event that the size of test packet 120 is larger than the MTU value.

In one example, source device 202 and/or destination device 206 may contain and/or facilitate one or more ports. These ports may represent any type or form of communication endpoint. For example, a port may represent a physical outlet or interface by which packets may be transferred. Additionally or alternatively, a port may represent a software-defined construct or destination. As will be explained in greater detail below, the invalid port on destination device 206 may represent an unassigned, nonexistent, or otherwise non-functional port that has been dedicated for use in PMTU discovery.

The systems described herein may perform step 310 in a variety of ways and/or contexts. In some examples, forwarding module 104 may forward test packet 120 along the network path in response to receiving or identifying a request to determine the PMTU of the network path. For example, forwarding module 104 may determine that a user or computing device has requested to forward traffic along the network path. In response to this determination, forwarding module 104 may begin the process of discovering the PMTU of the network path to transmit the traffic in the most efficient way. Additionally or alternatively, forwarding module 104 may determine that a predetermined amount of time (e.g., two hours, one day, etc.) has lapsed since the PMTU of the network path was last determined. As such, forwarding module 104 may begin re-determining the PMTU of the network path to account for potential changes in the topology or configuration of the network path.

Before forwarding test packet 120 along the network path, forwarding module 104 may identify the invalid port on destination device 206. In some examples, forwarding module 104 may identify a predetermined or preconfigured port on destination device 206 that has been reserved as a port for use in PMTU discovery. In addition, this port may be unreachable and/or unusable by network traffic and/or network devices. As will be explained in greater detail below, directing a packet to this invalid port may prompt or trigger an error message to be returned to source device 202.

In some embodiments, forwarding module 104 may obtain or have previous knowledge of the invalid port's name, number, and/or other identification information. For example, both source device 202 and destination device 206 may be manufactured and/or programmed with knowledge of the invalid port. In this example, forwarding module 104 may access information stored within source device 202 that identifies the invalid port. In other embodiments, destination device 206 may set or configure the invalid port and then communicate information identifying the invalid port to source device 202.

After identifying the invalid port on destination device 206, forwarding module 104 may generate and/or format test packet 120. Forwarding module 104 may format test packet 120 to follow any type or form of protocol within the Transmission Control Protocol/Internet Protocol (TCP/IP) protocol model. In an exemplary embodiment, test packet 120 may represent a User Datagram Protocol (UDP) packet. In some examples, UDP may facilitate fast, connectionless data transfer, thereby enabling the disclosed systems to efficiently discover PMTUs.

In some embodiments, forwarding module 104 may configure test packet 120 to be fragmented as necessary by intermediary devices along the network path. For example, forwarding module 104 may include information within test packet 120 that indicates test packet 120 is to be fragmented, rather than dropped, by intermediary devices whose egress interfaces (i.e., exit or forwarding interfaces) have MTU values less than the current size of test packet 120. Specifically, forwarding module 104 may clear (e.g., set to a logical "0") a Don't Fragment (DF) bit within a header of test packet 120. In this way, forwarding module 104 may ensure that test packet 120 (either whole or fragmented into segments) reaches destination device 206.

Additionally, in some embodiments, forwarding module 104 may set the initial size of test packet 120 to comply with the MTU value of the egress interface of source device 202. The phrase "to comply with," as used herein in connection with the MTU of an egress interface, generally refers to the size of a packet or segment being less than or equal to the MTU of that egress interface.

Figure 4:
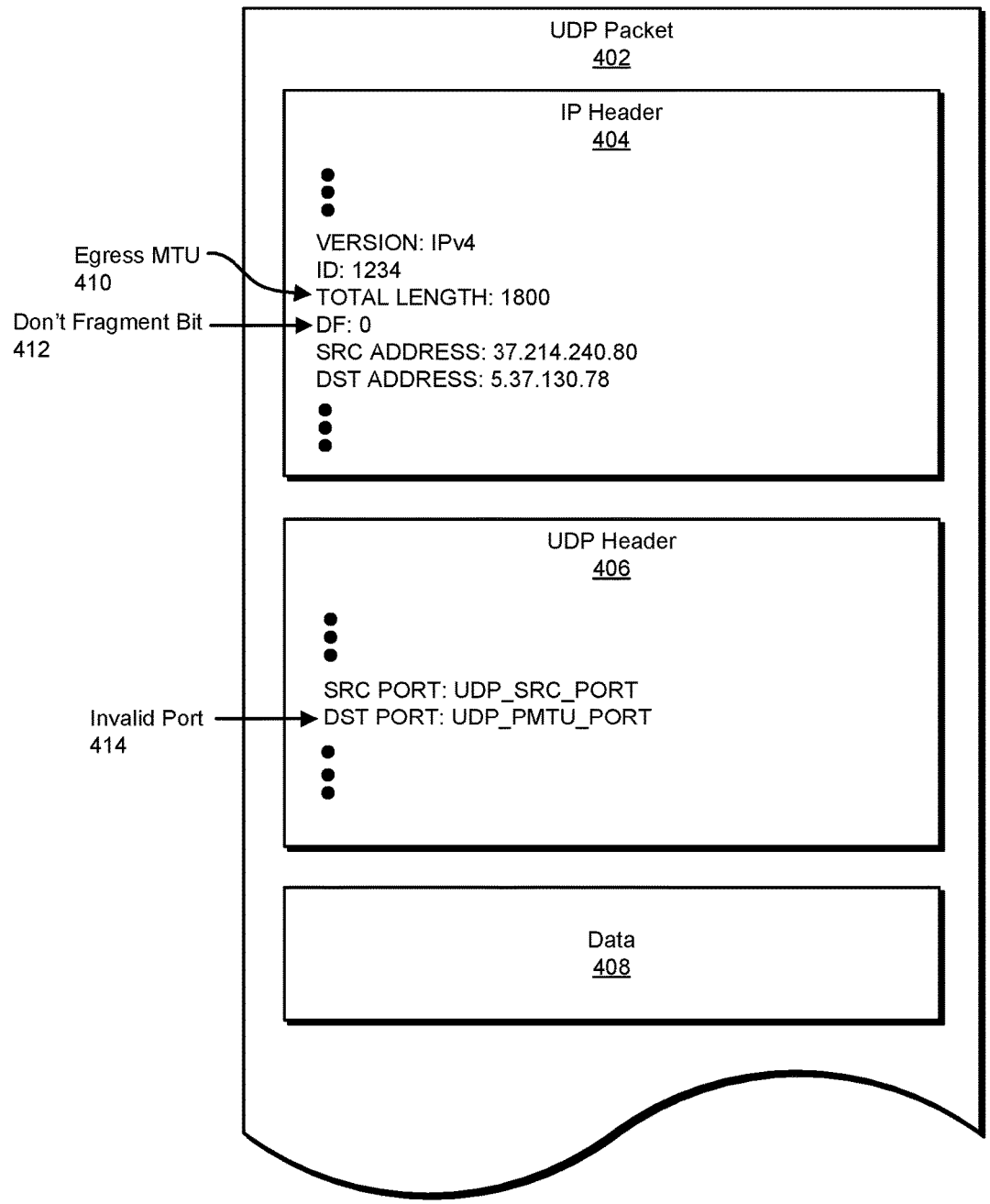
FIG. 4 is an illustration of an exemplary test packet used to discover PMTUs.

As an example of test packet 120, FIG. 4 illustrates a UDP packet 402. As shown in FIG. 4, UDP packet 402 may include an IP header 404, a UDP header 406, and data 408. In this example, IP header 404 and/or UDP header 406 may describe one or more properties, settings, and/or characteristics of UDP packet 402 that may be used by intermediary devices within the network path to route UDP packet 402 to destination device 206. For example, IP header 404 may indicate that UDP packet 402 is formatted to comply with Internet Protocol version 4 (IPv4). IP header 404 may also indicate that the identification number of UDP packet 402 is "1234." In addition, IP header 404 may indicate that the total length of UDP packet 402 (e.g., the total number of bytes contained within UDP packet 402) is 1800. As shown in FIG. 4, this value represents an egress MTU 410, which may indicate the MTU value of the egress interface of source device 202. Furthermore, IP header 404 may indicate that a Don't Fragment bit 412 of UDP packet 402 has been cleared.

As shown in FIG. 4, IP header 404 may also indicate a source IP address (i.e., "37.214.240.80") and an intended destination IP address (i.e., "5.37.130.78") of UDP packet 402. In one embodiment, these IP addresses may correspond to IP addresses of source device 202 and destination device 206. In addition, UDP header 406 may indicate a source port and an intended destination port of UDP packet 402. In this example, forwarding module 104 may populate the destination port field of UDP header 406 with the port "UDP_P-MTU_PORT," which may correspond to an invalid port designated for use in discovering PMTUs on destination device 206. As shown in FIG. 4, this port may represent an invalid port 414. In some examples, forwarding module 104 may format and/or populate one or more additional fields within IP header 404 and/or UDP header 406 not shown in FIG. 4, such as an Internet Header Length (IHL) field and/or a checksum field.

Once test packet 120 has been appropriately formatted and addressed to the invalid port on destination device 206, forwarding module 104 may forward test packet 120 to the next intermediary device within the network path. In the event that the size of test packet 120 complies with an MTU value of the intermediary device's egress interface, the intermediary device may simply forward test packet 120 to the next downstream device. In the event that the size of test packet 120 does not comply with the MTU value, the intermediary device may fragment test packet 120 into segments whose respective sizes each comply with the MTU. In some examples, this process may repeat until each segment of test packet 120 reaches destination device 206.

Figure 5:
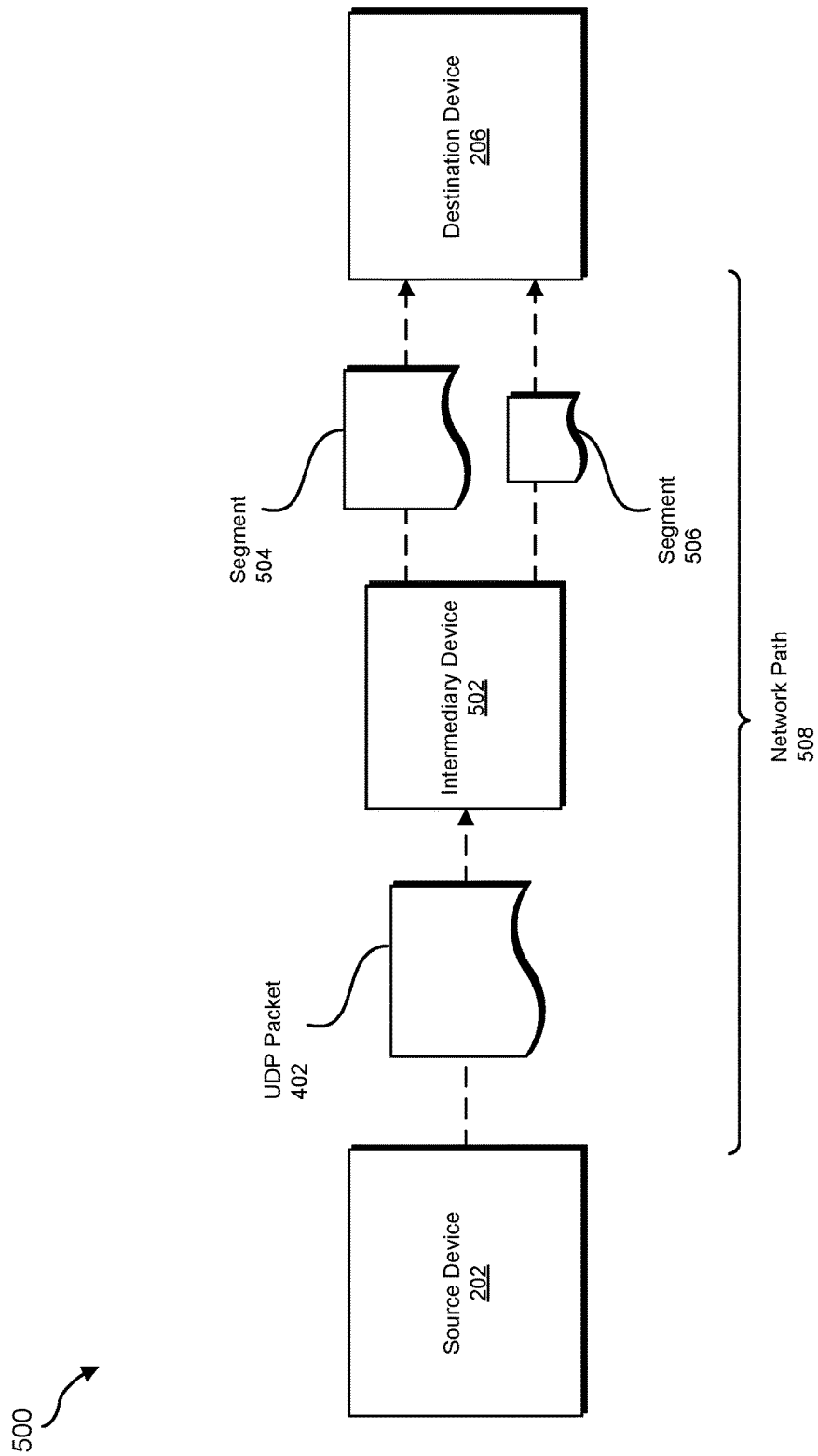
FIG. 5 is a block diagram of an exemplary implementation of a system for discovering PMTUs.

FIG. 5 illustrates an exemplary implementation of forwarding a test packet along a network path. In particular, FIG. 5 illustrates an example of forwarding UDP packet 402 from FIG. 4 along a network path 508 that begins at source device 202 and ends at destination device 206. In this example, network path 508 may include an intermediary device 502. In one embodiment, the egress interface of intermediary device 502 may have an MTU value of 1600 bytes. After receiving UDP packet 402 from source device 202, intermediary device 502 may determine that UDP packet 402 must be fragmented before being forwarded to destination device 206, as the size of UDP packet 402 does not comply with the MTU value of intermediary device 502 (e.g., UDP packet 402 may contain 1800 bytes, as explained in connection with FIG. 4). Accordingly, intermediary device 502 may fragment UDP packet 402 into a segment 504 and a segment 506. In this example, the relative sizes of UDP packet 402, segment 504, and segment 506 may represent relative amounts of data contained within each packet. In one embodiment, segment 504 may contain 1600 bytes (corresponding the MTU value of intermediary device 502) and segment 506 may contain 200 bytes (the remaining data from UDP packet 402 not included within segment 504).

After fragmenting UDP packet 402 into segments 504 and 506, intermediary device 502 may forward segments 504 and 506 to destination device 206. Although not shown in FIG. 5, network path 508 may contain any number of additional intermediary devices. In some examples, one or more of these intermediary devices may fragment segment 504 and/or segment 506 to comply with MTU values of network interfaces of the intermediary devices.

Returning to FIG. 3, at step 320 one or more of the systems described herein may receive an error packet sent by the destination device in response to having determined that the test packet is destined for the invalid port. For example, receiving module 106 may, as part of source device 202 in FIG. 2, receive error packet 122 sent by destination device 206 in response to destination device 206 determining that test packet 120 is destined for the invalid port.

The systems described herein may perform step 320 in a variety of ways and/or contexts. In some examples, destination device 206 (e.g., a network stack or protocol stack operating within destination device 206) may receive test packet 120 after test packet has 120 been forwarded along the network path. In the event that test packet 120 has been fragmented into multiple segments, destination device 206 may reassemble and/or combine the fragments to produce the original version of test packet 120. Destination device 206 may then search the header of test packet 120 to determine a specific port on destination device 206 to which test packet 120 is addressed. In some embodiments, destination device 206 may determine that the destination port of test packet 120 is invalid. For example, destination device 206 may determine that the destination port is unassigned, unreachable, and/or otherwise non-functional.

In response to determining that test packet 120 is destined for the invalid port, destination device 206 may generate error packet 122 to be forwarded to source device 202. Error packet 122 may include any type or form of information that indicates destination device 206 was unable to forward test packet 120 to its intended destination port. In addition, error packet 122 may be formatted to comply with any type or form of protocol within the TCP/IP protocol model. In an exemplary embodiment, error packet 122 may represent an Internet Control Message Protocol (ICMP) packet.

In some embodiments, destination device 206 may determine that the invalid port to which test packet 120 is addressed is an invalid port dedicated to discovering PMTUs of network paths. For example, destination device 206 may compare the destination port of test packet 120 with a port name and/or number known by destination device 206 to be allocated for PMTU discovery. Referring to the example of FIGS. 4 and 5, destination device 206 may determine that UDP packet 402 was forwarded to destination device 206 as an initial step of discovering the PMTU of network path 508 based on determining that UDP packet 402 is destined for the "UDP_PMTU_PORT" within destination device 206.

In response to determining that test packet 120 was addressed to the invalid port dedicated for use in PMTU discovery, destination device 206 may identify the size of the largest fragmented segment of test packet 120 that reached destination device 206. In one example, destination device 206 may determine this size by identifying the size of the first segment of test packet 120 to reach destination device 206 (e.g., the segment with a fragment offset of "0"). Additionally or alternatively, destination device 206 may identify this size by performing a command and/or query on the reassembled test packet. As an example, in the event destination device 206 runs a LINUX operating system, destination device 206 may execute a "frag_max_size" instruction, which may return the size of the largest fragmented portion of test packet 120.

After identifying the size of the largest fragmented portion of test packet 120, destination device 206 may add and/or insert this size into error packet 122. Destination device 206 may indicate this size within error packet 122 in a variety of ways. In one example, destination device 206 may populate a predetermined and/or specially-configured field within error packet 122 with the size. For example, both destination device 206 and source device 202 may have knowledge of a particular error packet field that is dedicated to providing information about the largest fragmented size of corresponding test packets. By indicating the size of the largest fragmented segment of test packet 120 within this field of error packet 122, destination device 206 may efficiently communicate the PMTU of the network path to source device 202.

Figure 6:
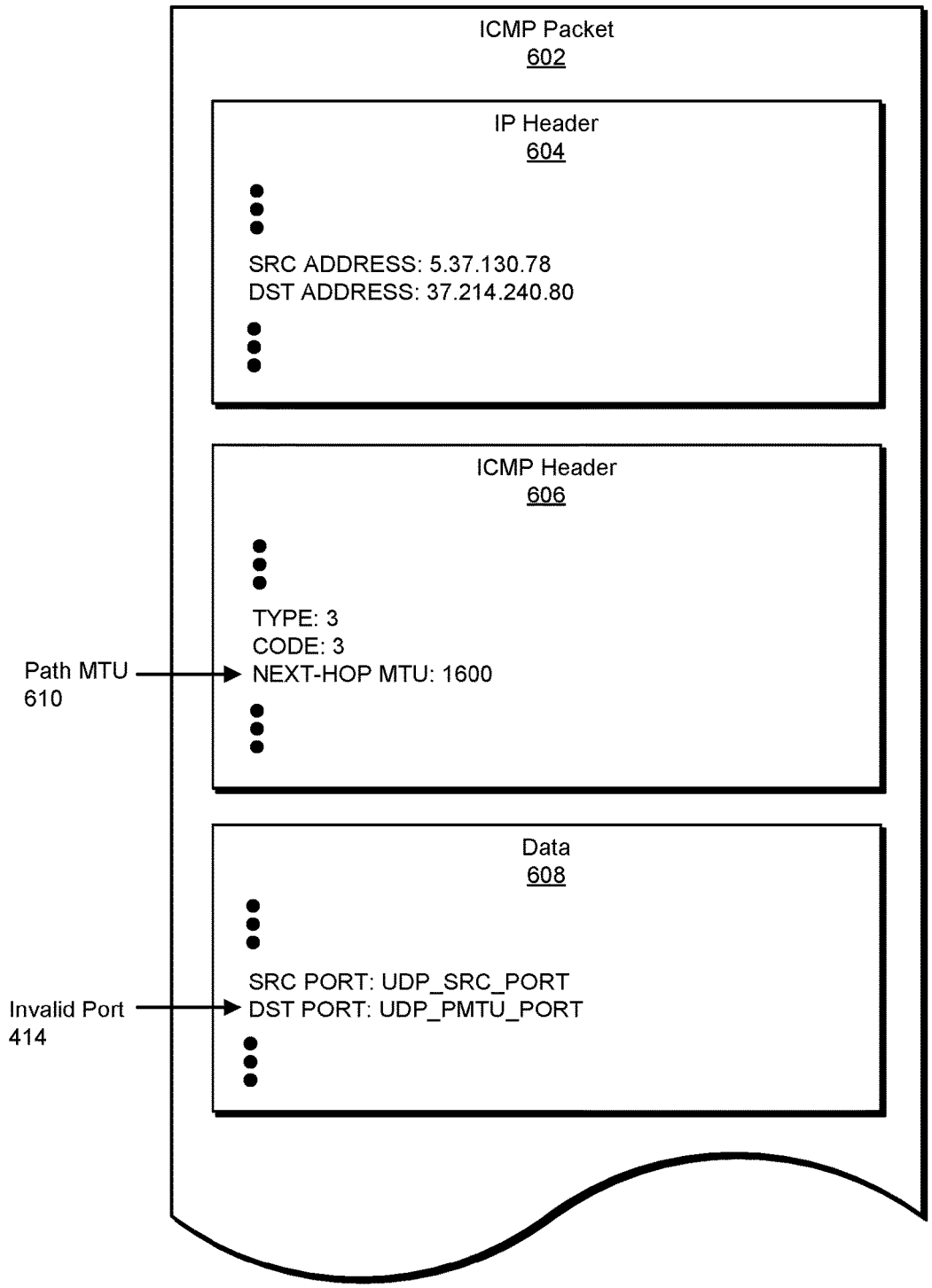
FIG. 6 is an illustration of an exemplary error packet used to discover PMTUs.

As an example of error packet 122, FIG. 6 illustrates an ICMP packet 602. As shown in FIG. 6, ICMP packet 602 may include an IP header 604, an ICMP header 606, and data 608. In this example, IP header 604 and/or ICMP header 606 may describe one or more properties, characteristics, and/or settings of ICMP packet 602 that may be used by intermediary devices within the network path to route ICMP packet 602 to source device 202. For example, IP header 604 may indicate a source IP address and a destination IP address of ICMP packet 602. As shown in FIG. 6, these IP addresses may correspond to the destination IP address and the source IP address illustrated within UDP packet 402 in FIG. 4.

In addition, ICMP header 606 may indicate that ICMP packet 602 is a "type 3" error packet (i.e., corresponding to a "destination unreachable" error). Specifically, ICMP header 606 may indicate that the type 3 error is a "code 3" error (i.e., corresponding to an "unreachable destination port"). In some embodiments, such an error packet may be automatically generated by a network stack in response to receiving a network packet that is destined for an invalid port (such as test packet 120).

ICMP header 606 may also include information that indicates the PMTU of the network path. In one example, destination device 206 may include this information within ICMP header 606 in response to determining that UDP packet 402 is destined for invalid port 414. In the example of FIG. 6, destination device 206 may include the size of the largest fragmented segment of UDP packet 402 (i.e., 1600 bytes) within a "next-hop MTU" field of ICMP header 606. As shown in FIG. 6, this value represents a path MTU 610, which may indicate the PMTU value of network path 508 in FIG. 5. In some examples, "next-hop MTU" fields may typically be used by "code 4" ICMP packets. By including path MTU 610 within the "next-hop MTU" field (or another field not typically used by "code 3" ICMP packets), destination device 206 may clearly and efficiently indicate the PMTU value of network path 508 to source device 202.

In some examples, destination device 206 may include, within ICMP packet 602, the source port and the destination port of the test packet that triggered generation of ICMP packet 602. For example, destination device 206 may copy or replicate all or a portion of IP header 404, UDP header 406, and/or data 408 of UDP packet 402 within data 608 of ICMP packet 602. As such, data 608 may include a "destination port" field that identifies invalid port 414 (i.e., "UDP_PMTU_PORT").

In some embodiments, ICMP packet 602 may include additional data and/or header fields not illustrated within FIG. 6. In general, destination device 206 may generate and/or format error packet 122 in any suitable manner to ensure that error packet 122 reaches source device 202 and indicates the largest received segment of test packet 120. After generating and formatting error packet 122, destination device 206 may forward error packet 122 to source device 202. For example, destination device 206 may initiate forwarding error packet 122 along the reverse of the network path by which test packet 120 traveled from source device 202 to destination device 206. Once error packet 122 reaches source device 202, receiving module 106 may identify error packet 122 at an ingress interface of source device 202.

Returning to FIG. 3, at step 330 one or more of the systems described herein may determine a PMTU value of the network path by identifying, within the error packet, a size of the largest fragmented segment of the test packet received by the destination device. For example, determining module 108 may, as part of source device 202 in FIG. 2, determine a PMTU value of the network path by identifying, within error packet 122, a size of the largest fragmented section of test packet 120 received by destination device 206. In this example, the PMTU value of the network path may represent and/or indicate the size of the largest packet that is capable of being forwarded along the network path without fragmentation. In other words, the PMTU of the network path may represent the smallest MTU of all the network interfaces within the network path.

The systems described herein may perform step 330 in a variety of ways and/or contexts. In some examples, determining module 108 may receive error packet 122 from receiving module 106 after receiving module 106 identifies error packet 122 at source device 202. Determining module 108 may then determine that destination device 206 generated error packet 122 in response to determining that test packet 120 was destined for the invalid port. For example, determining module 108 may determine that destination device 206 included, within error packet 122, information that identifies the invalid port. Referring to the example of FIG. 6, determining module 108 may identify invalid port 414 within ICMP packet 602. Based on such a determination, determining module 108 may conclude that destination device 206 may have inserted the size of the largest fragmented segment of test packet 120 into error packet 122. Accordingly, determining module 108 may search error packet 122 for information indicating this size.

In one embodiment, determination module 108 may search a predetermined field within error packet 122 to identify the size of the largest fragmented segment of test packet 120. Referring to the example of FIG. 6, determination module 108 may search the "next-hop MTU" field of ICMP packet 602. As this size may represent the largest portion of data capable of being transmitted along the network path without requiring fragmentation, determination module 108 may determine that the size represents the PMTU of the network path.

In some embodiments, determination module 108 may determine that an error packet received in response to forwarding a test packet along a network path to an invalid port on a destination device does not contain an indication of the PMTU of the network path. For example, determination module 108 may receive a "type 3" ICMP packet from a destination device and determine that the destination device sent the ICMP packet in response to receiving a test packet destined for a port dedicated for PMTU discovery (e.g., a "UDP_PMTU_PORT" port). However, determination module 108 may determine that the ICMP packet does not include a "next-hop MTU" field populated with the size of the largest fragmented segment of the test packet. Accordingly, determination module 108 may determine that the destination device that sent the ICMP packet is not configured to indicate PMTU values within error packets. In some examples, the disclosed systems may then determine the PMTU value of the network path using any additional or alternative method.

Returning to FIG. 3, at step 340 one or more of the systems described herein may forward, along the network path, at least one packet sized to comply with the PMTU value such that the packet remains unfragmented upon reaching the destination device. For example, forwarding module 104 may, as part of source device 202 in FIG. 2, forward along the network path, sized packet 124 that complies with the PMTU value such that sized packet 124 remains unfragmented upon reaching destination device 206.

The systems described herein may perform step 340 in a variety of ways and/or contexts. In some examples, forwarding module 104 may receive a request to forward data along the network path. As discussed above, this request may have initiated the process of discovering the PMTU value of the network path. Alternatively, forwarding module 104 may receive such a request after the PMTU value has been discovered. In response to the request, forwarding module 104 may divide the data to be forwarded into a sufficient number of packets such that the data is spread across packets whose respective sizes each comply with the PMTU value of the network path. In some examples, forwarding module 104 may re-format existing packets containing the data to ensure that the existing packets comply with the PMTU value. Additionally or alternatively, forwarding module 104 may generate new packets that contain the data to be forwarded.

After appropriately formatting and addressing the packets containing the data to be forwarded, forwarding module 104 may forward the packets along the network path to destination device 206. Destination device 206 may receive the packets and determine that the packets have remain unfragmented while traversing the network path. Accordingly, destination device 206 may avoid the step of reassembling fragments of the packets and proceed directly to routing, analyzing, and/or handling the packets according to information within their headers and/or payloads.

Figure 7:
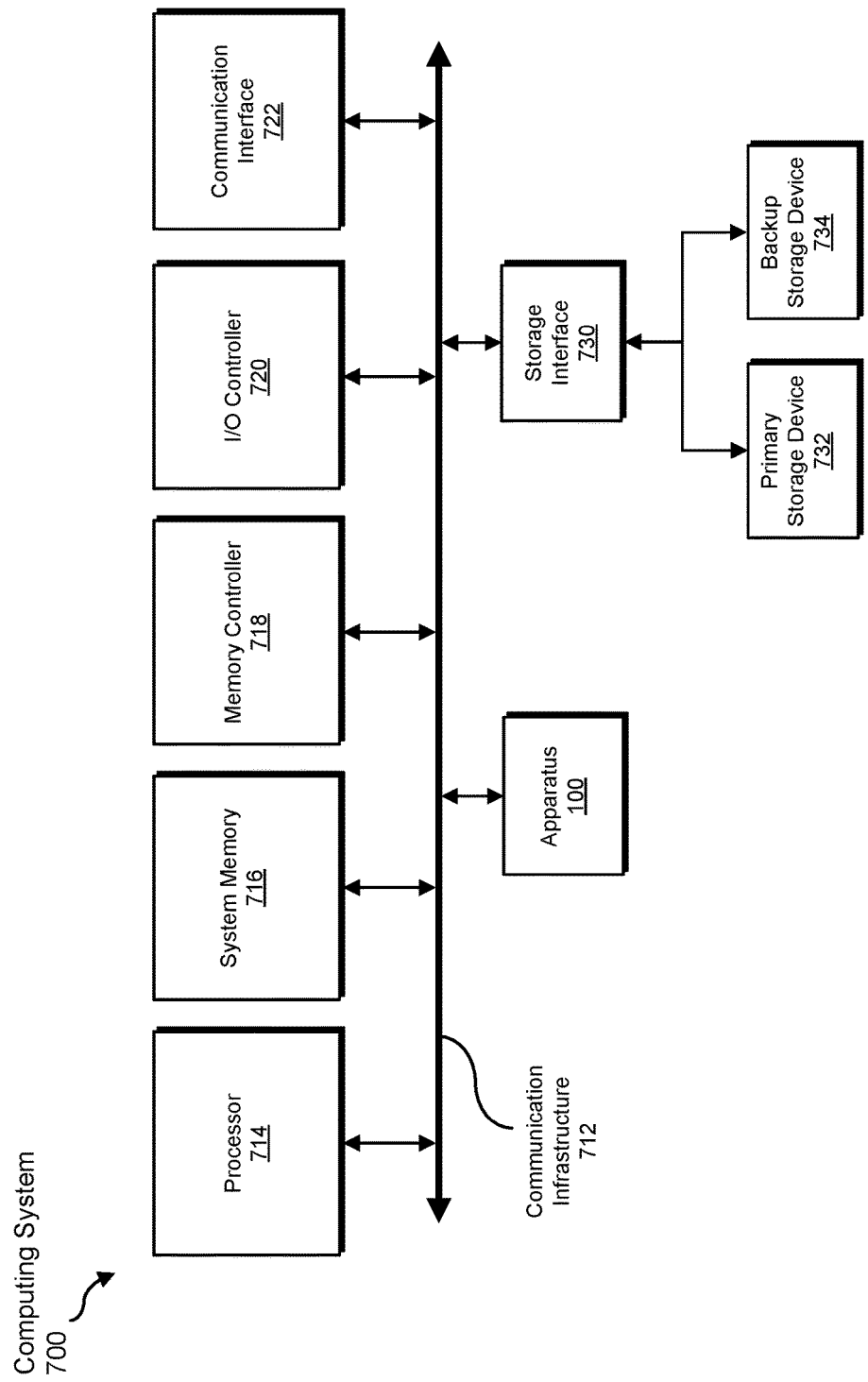
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include system 100 from FIG. 1 and/or system 200 from FIG. 2.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 and/or system 200 in FIG. 2 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   forwarding, along a network path, a test packet that is:
   destined for a particular invalid port on a destination device, the particular invalid port being:
   not configured to handle packets; and
   designated for use in discovering path maximum transmission units; and
   fragmented by an intermediary device within the network path according to a maximum transmission unit value of a network interface on the intermediary device;
   receiving an error packet sent by the destination device in response to having determined that the test packet is destined for the particular invalid port;
   determining a path maximum transmission unit value of the network path by identifying, within the error packet, a size of a largest fragmented segment of the test packet received by the destination device; and
   forwarding, along the network path, packets sized to comply with the path maximum transmission unit value such that the packets remain unfragmented upon reaching the destination device.

2. The method of claim 1, wherein the test packet comprises a User Datagram Protocol (UDP) packet.

3. The method of claim 1, wherein the error packet comprises an Internet Control Message Protocol (ICMP) packet.

4. The method of claim 1, further comprising clearing a Don't Fragment (DF) bit within the test packet such that the intermediary device is able to fragment the test packet.

5. The method of claim 1, further comprising setting an initial size of the test packet to comply with a maximum transmission unit value of an egress interface of a source device that initiates forwarding the test packet along the network path.

6. The method of claim 5, further comprising determining, by the source device, the particular invalid port on the destination device by identifying a port known by both the source device and the destination device to be designated for use in determining path maximum transmission unit values.

7. The method of claim 5, wherein the destination device inserts the size of the largest fragmented segment of the test packet into a predetermined field within the error packet in response to determining that the test packet is destined for the particular invalid port.

8. The method of claim 7, wherein determining the path maximum transmission unit value of the network path comprises searching, by the source device, the predetermined field within the error packet for the path maximum transmission unit value of the network path.

9. The method of claim 8, wherein searching the predetermined field within the error packet comprises:
identifying, within the error packet, information indicating that the test packet was destined for the particular invalid port; and
in response to identifying the information, searching the predetermined field within the error packet.

10. The method of claim 1, wherein:
forwarding the test packet comprises sending a single test packet to test the path maximum transmission unit value of the network path; and
determining the path maximum transmission unit value of the network path comprises making the determination as to the path maximum transmission unit value based on the single test packet.

11. A system comprising:
a forwarding module, stored in memory, that forwards, along a network path, a test packet that is:
destined for a particular invalid port on a destination device, the particular invalid port being:
not configured to handle packets; and
designated for use in discovering path maximum transmission units; and
fragmented by an intermediary device within the network path according to a maximum transmission unit value of a network interface on the intermediary device;
a receiving module, stored in memory, that receives an error packet sent by the destination device in response to having determined that the test packet is destined for the particular invalid port;
a determining module, stored in memory, that determines a path maximum transmission unit value of the network path by identifying, within the error packet, a size of a largest fragmented segment of the test packet received by the destination device;
wherein the forwarding module forwards, along the network path, packets sized to comply with the path maximum transmission unit value such that the packets remain unfragmented upon reaching the destination device; and
at least one physical processor configured to execute the forwarding module, the receiving module, and the determining module.

12. The system of claim 11, wherein the test packet comprises a User Datagram Protocol (UDP) packet.

13. The system of claim 11, wherein the error packet comprises an Internet Control Message Protocol (ICMP) packet.

14. The system of claim 11, wherein the forwarding module clears a Don't Fragment (DF) bit within the test packet such that the intermediary device is able to fragment the test packet.

15. The system of claim 11, wherein the forwarding module sets an initial size of the test packet to comply with a maximum transmission unit value of an egress interface of a source device that initiates forwarding the test packet along the network path.

16. The system of claim 15, wherein the forwarding module determines the particular invalid port on the destination device by identifying a port known by both the source device and the destination device to be designated for use in determining path maximum transmission unit values.

17. The system of claim 15, wherein the destination device inserts the size of the largest fragmented segment of the test packet into a predetermined field within the error packet in response to determining that the test packet is destined for the particular invalid port.

18. The system of claim 17, wherein the determining module determines the path maximum transmission unit value of the network path by searching, at the source device, the predetermined field within the error packet for the path maximum transmission unit value of the network path.

19. The system of claim 18, wherein the determining module searches the predetermined field within the error packet by:
identifying, within the error packet, information indicating that the test packet was destined for the particular invalid port; and
in response to identifying the information, searching the predetermined field within the error packet.

20. An apparatus comprising:
a storage device that stores information that identifies a particular invalid port on a destination device, the particular invalid port being:
not configured to handle packets; and
designated for use in discovering path maximum transmission units; and
a physical processing device that is communicatively coupled to the storage device, wherein the physical processing device:
forwards, along a network path, a test packet that is:
destined for the particular invalid port on the destination device; and
fragmented by an intermediary device within the network path according to a maximum transmission unit value of a network interface on the intermediary device;
receives an error packet sent by the destination device in response to having determined that the test packet is destined for the particular invalid port;
determines a path maximum transmission unit value of the network path by identifying, within the error packet, a size of a largest fragmented segment of the test packet received by the destination device; and
forwards, along the network path, packets sized to comply with the path maximum transmission unit value such that the packets remain unfragmented upon reaching the destination device.

* * * * *